(12) United States Patent
Rothkopf

(10) Patent No.: US 9,335,793 B2
(45) Date of Patent: May 10, 2016

(54) COVER ATTACHMENT WITH FLEXIBLE DISPLAY

(75) Inventor: Fletcher R. Rothkopf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 13/208,235

(22) Filed: Aug. 11, 2011

(65) Prior Publication Data

US 2012/0194448 A1 Aug. 2, 2012

Related U.S. Application Data

(60) Provisional application No. 61/438,220, filed on Jan. 31, 2011.

(51) Int. Cl.
| | | |
|---|---|---|
| G06F 3/041 | (2006.01) | |
| G06F 3/045 | (2006.01) | |
| G09G 5/00 | (2006.01) | |
| G06F 1/16 | (2006.01) | |
| A45C 13/00 | (2006.01) | |
| A45C 15/00 | (2006.01) | |
| A45C 11/00 | (2006.01) | |

(52) U.S. Cl.
CPC .............. *G06F 1/1656* (2013.01); *A45C 11/00* (2013.01); *A45C 13/002* (2013.01); *A45C 15/00* (2013.01); *G06F 1/1626* (2013.01); *G06F 1/1632* (2013.01); *G06F 1/1643* (2013.01); *G06F 1/1647* (2013.01); *G06F 1/1652* (2013.01); *G06F 1/1654* (2013.01); *A45C 2011/003* (2013.01); *A45C 2200/15* (2013.01)

(58) Field of Classification Search
CPC ... G06F 1/1669; G06F 3/0202; G06F 1/1681; G06F 1/1684; G06F 3/0414; G06F 1/1626; G06F 1/1656; G06F 2200/1633; G06F 1/1613; H01F 7/04
See application file for complete search history.

(56) References Cited

U.S. PATENT DOCUMENTS

| | | | |
|---|---|---|---|
| 5,847,698 | A | 12/1998 | Reavey et al. |
| 6,628,244 | B1 | 9/2003 | Hirosawa et al. |
| 7,489,503 | B2 | 2/2009 | Maeaettae |
| 7,675,511 | B2 | 3/2010 | Hattori |
| 7,821,780 | B2 | 10/2010 | Choy |
| 2001/0054647 | A1* | 12/2001 | Keronen et al. ............... 235/492 |
| 2003/0098857 | A1 | 5/2003 | Gettemy |

(Continued)

FOREIGN PATENT DOCUMENTS

| | | |
|---|---|---|
| CN | 202548700 | 11/2012 |
| EP | 1276090 | 1/2003 |

(Continued)

OTHER PUBLICATIONS

Int'l Search Report for App. No. PCT/US2012/021378 dated Jul. 6, 2012.

(Continued)

*Primary Examiner* — Alexander Eisen
*Assistant Examiner* — Nan-Ying Yang
(74) *Attorney, Agent, or Firm* — Downey Brand LLP

(57) ABSTRACT

A tablet device with a flexible cover is disclosed. Thin flexible display technology can be integrated into the flexible cover without affecting the overall form factor of the cover or tablet device. Adding the integrated display to the flexible cover greatly enhances the overall functionality of the tablet device.

23 Claims, 14 Drawing Sheets

(56) References Cited

U.S. PATENT DOCUMENTS

| | | | |
|---|---|---|---|
| 2003/0179880 A1* | 9/2003 | Pan et al. | 379/433.13 |
| 2004/0005184 A1 | 1/2004 | Kim et al. | |
| 2004/0012191 A1* | 1/2004 | Stark | 281/51 |
| 2004/0044682 A1* | 3/2004 | Nakamura et al. | 707/102 |
| 2004/0070633 A1 | 4/2004 | Nakamura et al. | |
| 2004/0196210 A1 | 10/2004 | Nagatsuka et al. | |
| 2004/0207568 A1 | 10/2004 | Ooshima et al. | |
| 2006/0146488 A1* | 7/2006 | Kimmel | 361/681 |
| 2008/0117184 A1* | 5/2008 | Gettemy | 345/173 |
| 2008/0218491 A1* | 9/2008 | Wu | 345/173 |
| 2009/0091881 A1 | 4/2009 | Lee et al. | |
| 2009/0128504 A1 | 5/2009 | Smith | |
| 2009/0128785 A1* | 5/2009 | Silverstein | 353/119 |
| 2009/0159763 A1 | 6/2009 | Kim | |
| 2009/0172986 A1* | 7/2009 | Fuchsberg et al. | 40/610 |
| 2010/0064244 A1* | 3/2010 | Kilpatrick et al. | 715/773 |
| 2010/0117975 A1* | 5/2010 | Cho | 345/173 |
| 2010/0302179 A1* | 12/2010 | Ahn et al. | 345/173 |
| 2010/0306501 A1 | 12/2010 | Chang et al. | |
| 2010/0321275 A1* | 12/2010 | Hinckley et al. | 345/1.3 |
| 2011/0199727 A1* | 8/2011 | Probst | 361/679.09 |
| 2012/0194448 A1 | 8/2012 | Rothkopf | |

FOREIGN PATENT DOCUMENTS

| | | |
|---|---|---|
| JP | H04278658 | 10/1992 |
| JP | 2000250501 | 9/2000 |
| JP | 2004038950 | 2/2004 |
| JP | 2004078039 | 3/2004 |
| JP | 2004287076 | 10/2004 |
| JP | 2004302179 | 10/2004 |
| JP | 2004354789 | 12/2004 |
| JP | 2006053678 | 2/2006 |
| JP | 2006287982 | 10/2006 |
| JP | 2010277592 A | 12/2010 |
| JP | 2012073824 | 4/2012 |
| KR | 1020070038179 | 4/2007 |
| KR | 1020100102090 | 9/2010 |
| WO | WO02056284 | 7/2002 |
| WO | WO2005029296 | 3/2005 |
| WO | WO2007037807 | 4/2007 |

OTHER PUBLICATIONS

Written Opinion of the Int'l Searching Authority dated Jul. 6, 2012.
Kim, Min Seok, "The Real Notebook—Laptop Concept," http://www.yankodesign.com/2011/07/19/the-realnotebook/, Fujitsu, Jul. 19, 2011.
Chinese Application for Invention No. 201210021265.0—First Office Action dated Feb. 7, 2014.
Taiwanese Patent Application No. 101103152—Office Action dated Jun. 4, 2014.
European Patent Application No. 12704478.2—Office Action dated Jun. 12, 2014.
European Patent Application No. 12702354.7—Office Action dated Jun. 18, 2014.
Chinese Application for Invention No. 201210021265.0—Office Action dated Jul. 15, 2014.
Japanese Patent Application No. 2013-551997—Office Action dated Sep. 29, 2014.
Korean Patent Application No. 10-2015-7034296—Office Action dated Feb. 11, 2016.
Japanese Patent Application No. 2015-000495—First Office Action dated Feb. 15, 2016.

* cited by examiner

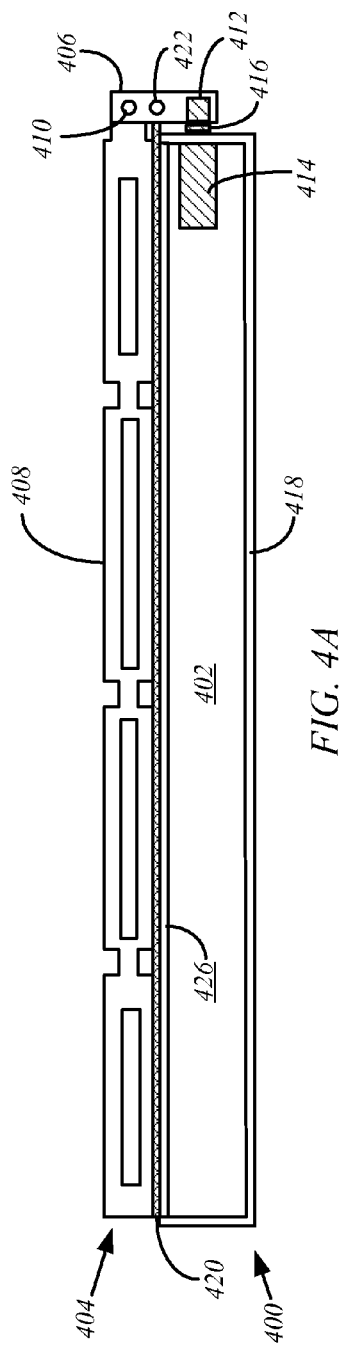
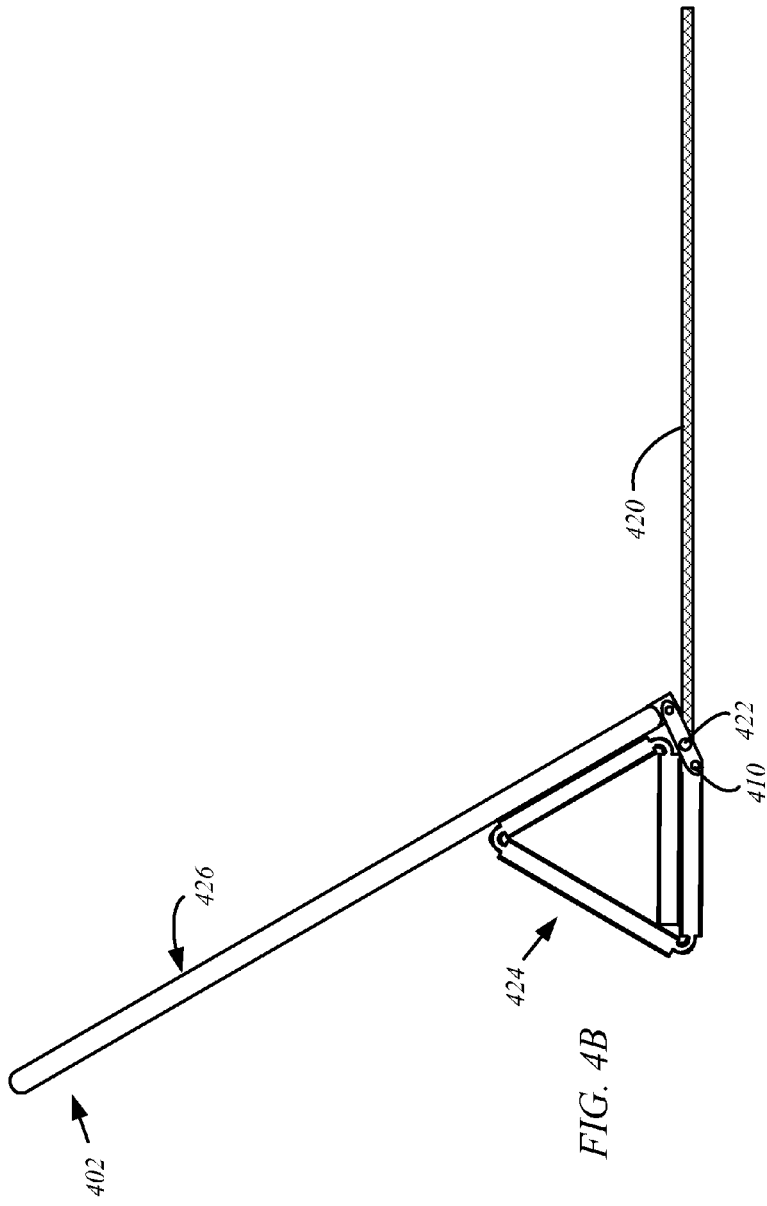
FIG. 4A
FIG. 4B

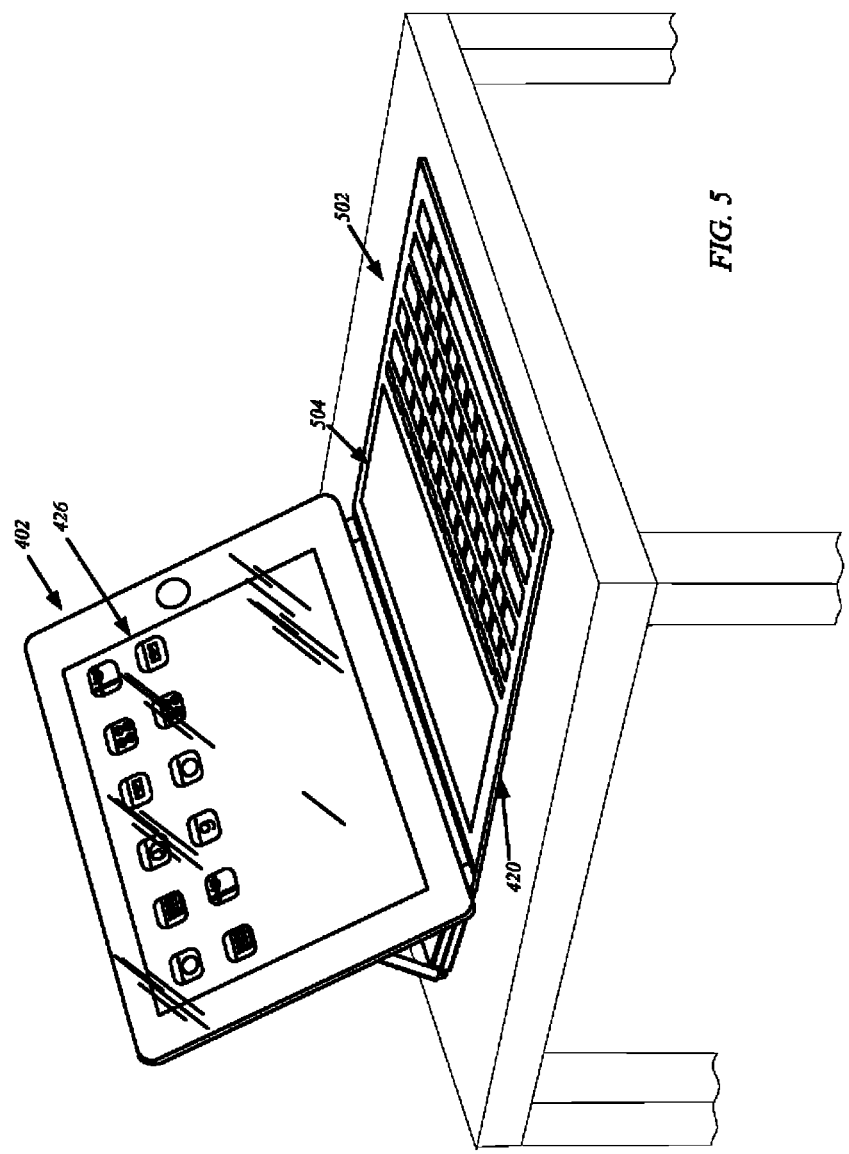

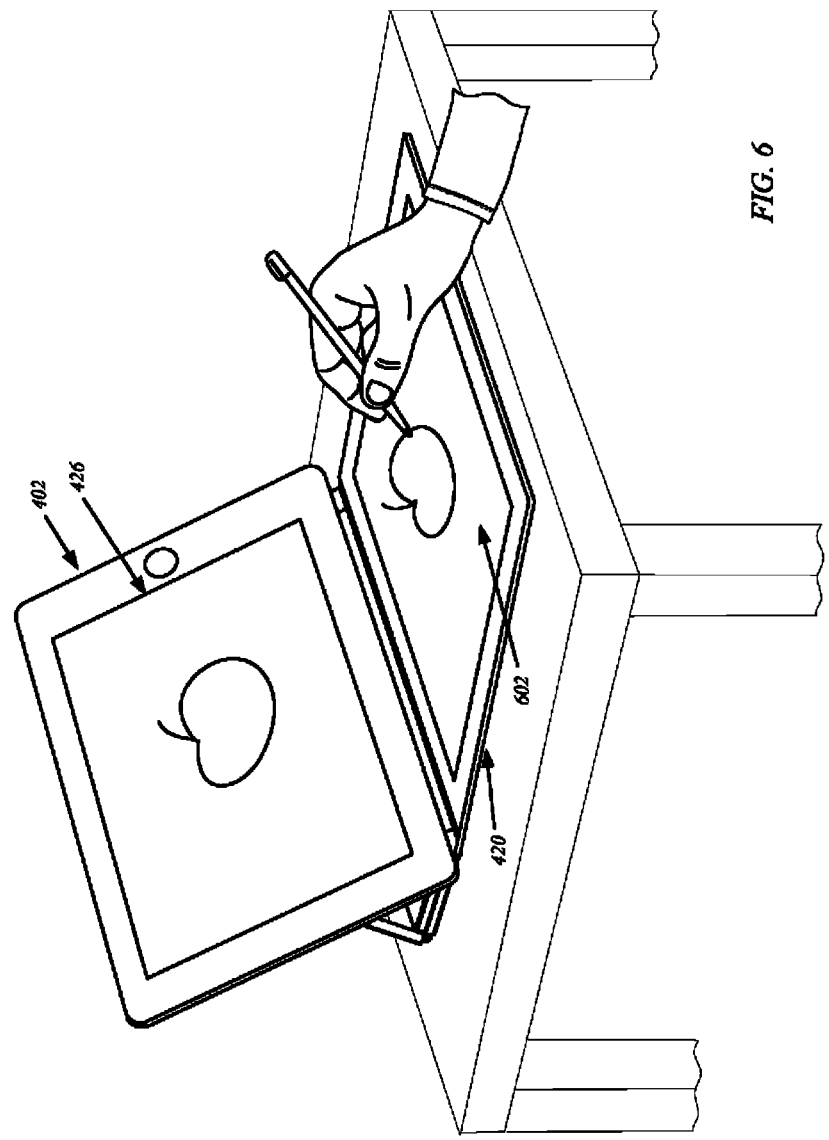

COVER ATTACHMENT WITH FLEXIBLE DISPLAY

CROSS REFERENCE TO RELATED APPLICATIONS

This application claims priority under 35 U.S.C. 119(e) to U.S. Provisional Patent Application No. 61/438,220, filed Jan. 31, 2011 and entitled "MAGNETIC ATTACHMENT UNIT AND METHODS OF USE" by Corbin et al., which is incorporated by reference in its entirety for all purposes.

BACKGROUND

1. Field of the Described Embodiments

The described embodiments relate generally to portable electronic devices. In particular methods for expanding the functionality of tablet devices are disclosed.

2. Related Art

Recent advances in portable computing include the introduction of hand held electronic devices and computing platforms known generically as tablet devices. These devices can be used for any number of tasks including word processing, social media networking, video conferencing, and gaming. Although this type of device allows an extensive variety of tasks to be performed, the overall functionality of this device type still has room for improvement. For example, increasing the display area could lead to a significant expansion in functionality. Unfortunately, since displays already dominate a majority of one side of tablet devices, device manufacturers generally choose between making the display and therefore the device itself larger, thereby reducing the portability or making the device and display smaller with the result of a less functional device.

Neither solution is desirable; therefore a way to extend the usability and functionality of a tablet device without making it any larger is desired.

SUMMARY OF THE DESCRIBED EMBODIMENTS

The paper describes many embodiments that relate to a method, apparatus, and, computer readable medium for extending the functionality of a tablet device to an accessory device with a flexible display.

An accessory device that is arranged to communicate with a host device by way of a communication channel is claimed. The host device includes a host device display arranged to present visual information. The accessory device includes the following: a flexible flap having a size and shape in accordance with the host device display, where at least a portion of the flexible flap is covered by a flap display configured to present visual information; and a connecting portion, the connecting portion arranged to provide at least a communication channel arranged to convey information between the host device and the accessory device where at least some of the information is presented visually on the flap display.

A method for passing information between a flexible accessory device and a host device is claimed. The flexible accessory device has a flexible display arranged to present a first set of visual information. The host device has a host device display arranged to present a second set of visual information. The method includes the following steps: (1) establishing a communication channel between the flexible accessory device and the host device, the communication channel arranged to provide a bi-directional communication link between the flexible display and the host device; (2) passing information between the host device and the flexible accessory device by way of the bi-directional communication link, where at least a portion of the passed information is presented by the flexible display as the first set of visual information; and (4) displaying the first set of visual information on the flexible display.

A consumer electronic product including the following: (1) a host device having side walls which further includes: a magnetic attachment system including a first magnetic attachment feature, the first magnetic attachment feature enclosed within the host device near a sidewall; and (2) a flexible accessory device, which further includes: a hinge portion having a second magnetic attachment feature causing the hinge portion to magnetically attach to the sidewall of the host device, a body portion pivotally attached to the hinge portion, wherein when the body portion is magnetically attached to the host device, the body portion folds over a top surface of the host device in a closed configuration and wherein when a lifting force is applied to the body portion, the body portion unfolds to an open configuration exposing the top surface of the electronic device, and a display portion disposed on one surface of the body portion.

A non-transitory computer readable medium is claimed for storing computer instructions executed by a processor in a tablet device for controlling a flexible accessory device in communication with the tablet device. The non-transitory computer readable medium includes: (1) computer code for establishing a communication channel between the flexible accessory device and the tablet device; (2) computer code for receiving a user input on a first user interface built into the tablet device; (3) computer code for interpreting the user input with the tablet device processor; (4) computer code for sending display data across the communication channel; and (5) computer code for displaying the display data on a flexible accessory device display.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4A shows a cross section of a system in accordance with an embodiment.

FIG. 4B shows a side view illustrating an embodiment in which a segmented cover and included flap portion can be rotated about their respective pivots separately where the segmented cover has been folded into a support structure.

FIG. 5 shows a perspective view of a tablet device with a keyboard and touch screen integrated into the flap portion.

FIG. 6 shows a perspective view of a tablet device with a touch screen integrated across a majority of a surface of the flap portion.

DETAILED DESCRIPTION OF EXAMPLE EMBODIMENTS

Figure 1A:
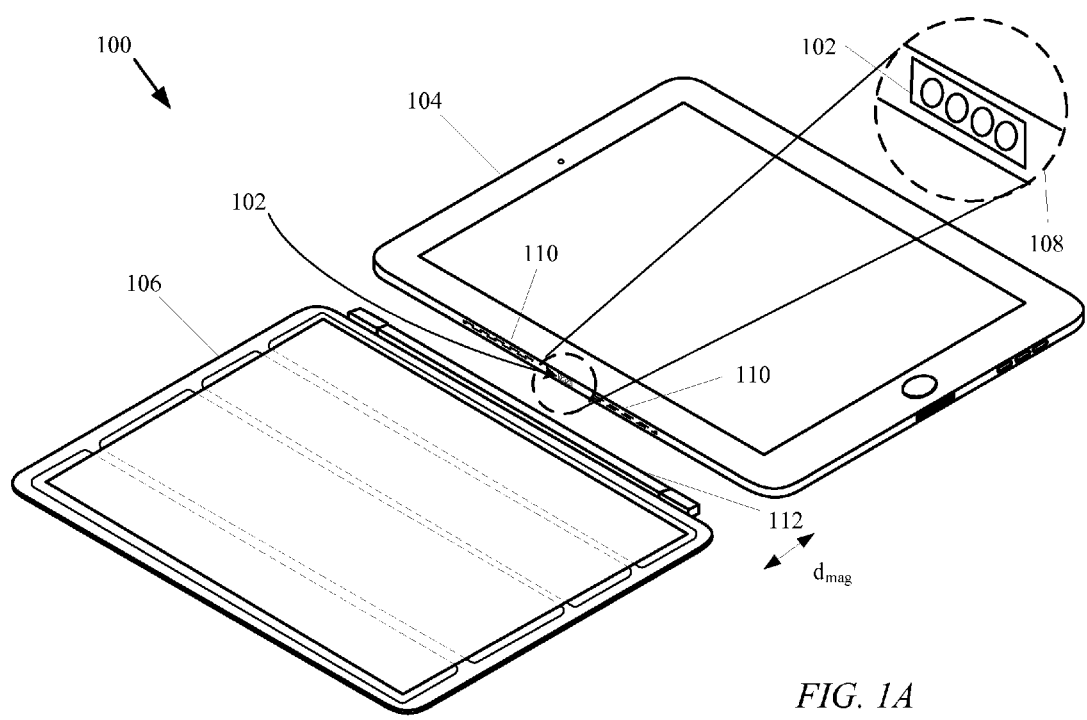
FIG. 1A shows a perspective view of a tablet device with a wired connector implemented between the tablet device and an accessory device in accordance with the described embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Accessories for tablet devices have become quite common. Today typical tablet accessories are passive in nature, the majority of which simply function to protect the screen, or perhaps support the tablet in some specific orientation. Although some devices such as Bluetooth headsets and keyboards do have limited interactive capability the majority of accessories are limited to more basic tasks. These accessories can be improved by including at least some of the following features: (1) a power source; (2) a communications protocol; (3) an input method; and (4) an independent storage medium.

An accessory that takes a more interactive role with the tablet would also typically need a power source to drive it. In some embodiments, a battery can be incorporated within the body of the accessory. The battery can take many forms. For example, the battery can be distributed in nature by which it is meant that portions of the battery can be placed in disparate locations in the accessory. In another example, the battery can be replaceable or otherwise accessible by the user. The operating time of a built in battery can be augmented by the addition of an auxiliary power supply such as a solar panel array to the accessory. For example, a solar panel array spread across a surface of an accessory device in the form of a cover can lengthen the amount of time the cover could be operated between recharging. A battery can also allow for the cover to continue nominal operations after it has been removed from the tablet device, especially with the inclusion of a small amount of storage space. For example, a simple screen saver could be displayed with an embodiment that includes an auxiliary display. In another embodiment where the cover includes a display portion, a document could be reviewed. In yet another embodiment, the document can be updated or otherwise modified by a user with a user interface, such as a keyboard, or touch pad, where the interface is built into the cover and powered by the cover battery.

Active communication between an accessory and a tablet device can be accomplished either wirelessly or through a wired data connection. For example, a wireless data connection utilizing the 5 GHz 802.11n protocol can provide sufficient data transmission bandwidth to transmit a high quality video stream along the lines of NTSC 1080p 30 fps video. The accessory can alternatively or additionally be electrically connected to the tablet device using any number of established standards such as DisplayPort™, mini DisplayPort™, DVI, and Thunderbolt™. A custom wireless or wired protocol is also certainly possible. While the wired solutions would enable simple, high speed data transfer, the wireless protocol has the advantage of allowing for communication between the two devices in a detached state.

In another embodiment power could be transferred to the accessory from the tablet itself through either a wireless or wired medium. Wireless charging methods, such as inductive charging can allow the accessory to be charged by the tablet itself without the addition of a power connector. Alternatively, a wired solution could be implemented by using a connector similar to the MagSafe® connectors used on the MacBook® line of computers manufactured by Apple Inc. of Cupertino, Calif. In one accessory embodiment the accessory can take the form of a cover such as the Smart Cover™ manufactured by Apple Inc. of Cupertino, Calif., which includes magnets which precisely align the cover and the tablet in the form of an iPad2. In one embodiment, the tablet device can include an electrical connector arranged to be held in place by the magnets thereby alleviating the need for a user to take affirmative action to provide power to and/or from the tablet device.

In yet another embodiment a customized connector that passes both data and power could allow for a simple connection between the two devices. For example a connector similar to the MagSafe® connector can be integrated with an auxiliary connector which passes data and or video. FIG. 1A shows arrangement 100 in accordance with a described embodiment showing connector 102 used to connect tablet device 104 and accessory device 106. Connector 102 can be configured as shown in close up view 108 with a number of separate connectors, allowing the power and display transfer lines to traverse separate channels. Such a connector 102 would eliminate the need for a wireless data transmitter in the cover and would make the electrical and data connections between the two devices quite simple. A wired data connection also removes security concerns associated with wireless communication protocols. Now that the electrical and data connection solutions have been discussed the following representative embodiments will include power and data connections between the accessory device and tablet as required.

Magnetic attraction areas 110 can be used to magnetically attach accessory 106 and tablet device 104. In a specific embodiment, magnetic attachment areas 110 can magnetically attach to magnetic elements (not shown) within hinge 112. Hinge 112 can be pivotally connected to accessory 106. In this way, accessory 106 can be configured in either an open or closed configuration with respect to tablet device 104. The magnetic attraction between magnetic attachment areas 110 and the magnetic elements in hinge 112 can be such that electronic device 104 and accessory 106 attach to each other in a preferred alignment. For example, the preferred alignment can assure that connector 102 aligns and mates with a corresponding receptor (not shown) on hinge 112. In this way, the user of tablet device 104 can simply place accessory 106 and tablet device 104 within proximity distance $d_{mag}$ to each other such that the magnetic attraction between magnetic attachment area 110 and the magnetic elements in hinge 112 cause tablet device 104 and accessory 106 to attach to each other with a high degree of confidence that a proper mechanical and electrical connection can be made.

In one embodiment, the attachment can occur between a tablet device and an accessory device where the tablet device and accessory device are each electronic devices. The electronic devices can be magnetically attached to each other to form a cooperative electronic system in which the electronic devices can communicate with each other. In one embodiment, the tablet and accessory devices can be attached to each other directly. In another embodiment, a magnetic attachment unit can be used to magnetically attach together the first and second electronic devices. Communication between the first and second electronic devices can occur before, during, and after the magnetic attachment is complete.

Figure 1B:
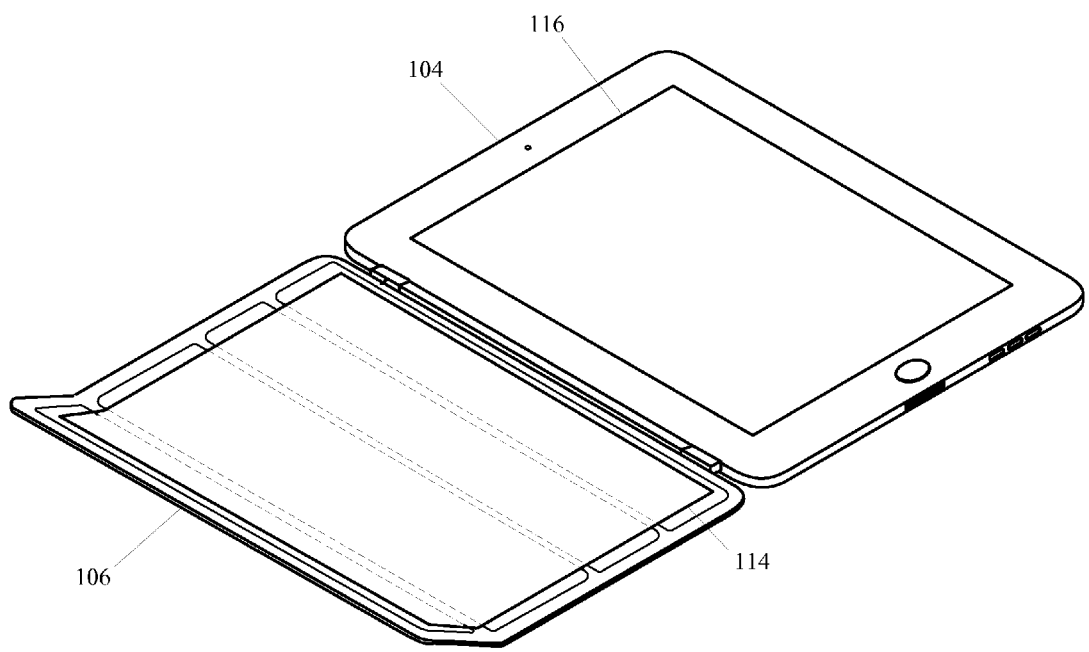
FIGS. 1B and 1C show perspective views of a tablet device with a flexible attached accessory device in accordance with the described embodiments.

FIG. 1B shows a perspective view of tablet device 104 with an attached accessory device 106 having display 114. In the described embodiment, accessory device 106 can take the form of cover 106 that can be used to both protect as well as provide functional support for tablet device 104. Accordingly, cover display 114 can be integrated with cover 106. Therefore, when cover 106 and tablet device 104 form cooperating system 100, cover display 114 can be used in conjunction with or in place of tablet display 116. Clearly, in order to maintain flexibility of cover 106, cover display 114 must also be flexible. Therefore, cover display 114 can take the form of a flexible display made of a durable, flexible material such as a polyimide substrate. In this way, cover display 114 and cover 106 can bend and flex together allowing for a thin, robust, and flexible design. It should be noted that touch screen technology can also be integrated into cover display 114. The integrated touch screen allows cover display 114 and tablet display 116 to have substantially similar functionality. The addition of cover display 114 ameliorates the limited screen area problem and makes a number of tasks significantly easier, in some cases functioning as an extended desktop. For example, reviewing two documents on a conventional tablet screen size of about 7-10 inches is difficult at best. Having two documents open at once on a screen of this size makes the text quite difficult to read. With an additional display, instead of having to switch back and forth between documents one of the documents can be moved to the cover display. In one embodiment this could be accomplished by a multi-touch gesture, essentially allowing a document to be pushed from the tablet display to the cover display.

Figure 1C:
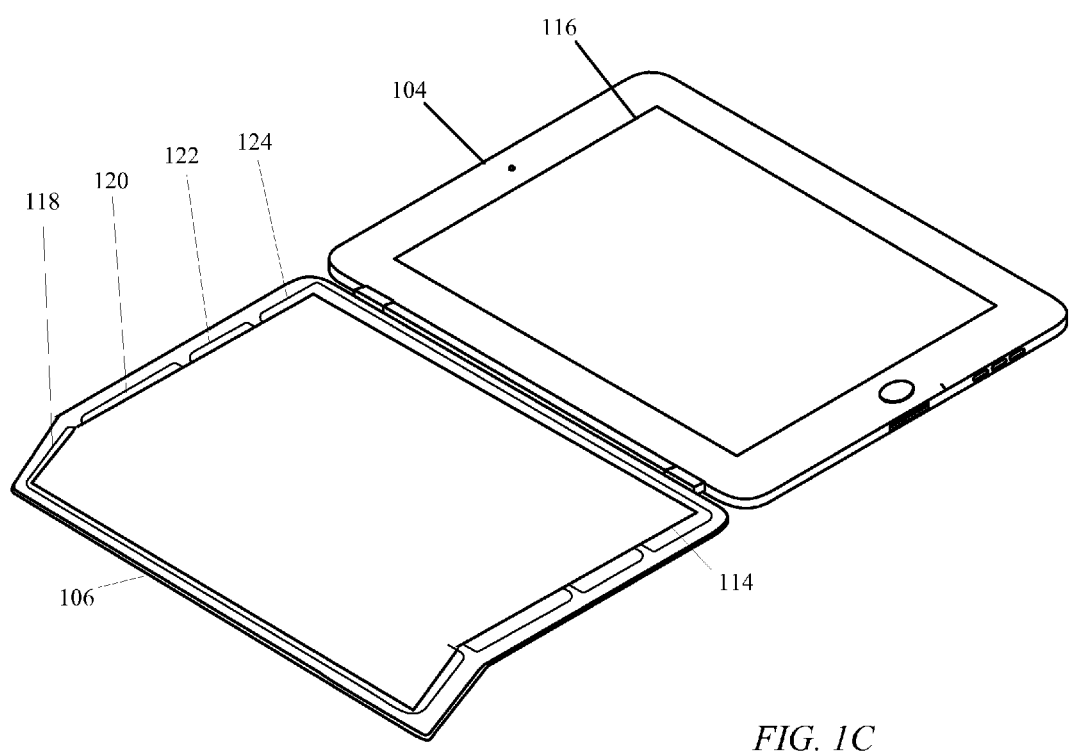

FIG. 1C shows a perspective view of tablet device 104 attached to cover 106. Cover 106 has a plurality of segments each of which can include a stiffener. For example, stiffeners 118, 120, 122, and 124 embedded within corresponding segments of cover 106 can provide shape and support to cover 106. Moreover, each of the segments can be separated by foldable regions that can provide flexibility in an upward or downward direction. For example, FIG. 1C shows how stiffener 118 of flexible attached cover 106 can flex about a corresponding folded region located between stiffeners 118 and 120. In this way flexible cover attachment 106 can be folded into number of useful configurations. In some configurations the flexible cover attachment can fold in half so as to take up less space. In other configurations it can take the form of a resilient triangular support structure for holding up a tablet device in a number of useful orientations.

Figure 2A:
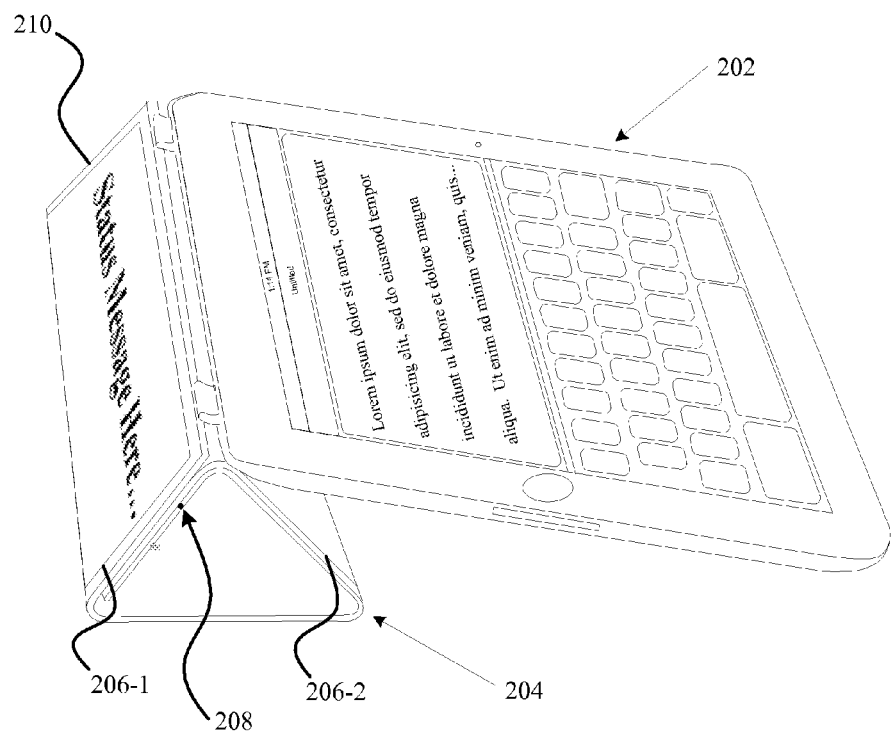
FIG. 2A shows a perspective view of a tablet device attached to a folded segmented cover having an integrated cover display.

FIG. 2A shows a perspective view of tablet device 202 attached to cover 204 with cover display 206. In one embodiment, cover 204 is shown folded into a triangular shape that can be used for support, allowing tablet device 202 to be placed in an orientation that is convenient for typing on tablet device 202's virtual keyboard. In this embodiment cover display 206 covers at least first segment 208 of cover 204, indicated by label 206-1. Cover display 206 can also wrap around cover 204 as further indicated by label 206-2. Cover display 206 can be automatically activated in this orientation when sensor 208 embedded in flexible cover 204 determines the cover is folded. In another embodiment, after determining the cover is closed an accelerometer included in tablet device 202 can confirm the tablet's orientation is within a certain range of values before automatically activating cover display 206. By using an active matrix organic light emitting diode (AMOLED) display for cover display 206 single pixels can be lit up, as opposed to conventional LCD technology in which the entire screen is in either an on or an off state. Consequently, an AMOLED screen can display small amounts of text at extremely conservative power levels. With this technology in combination with the orientation determining sensors only the portion of cover display 206 on segment 210 can be activated providing a number of useful features. For example, the small amount of power consumed when only a few pixels are active can help to conserve battery life. Once activated, cover display 206 can perform a number of useful functions when the cover is disposed in this orientation. In one embodiment a user's social media site status could be displayed. In another embodiment a certain number of recent words typed into a word processing application could be displayed. In yet another embodiment the display could simply display the tablet user's name, which is useful in settings such as a conference or a classroom.

Figure 2B:
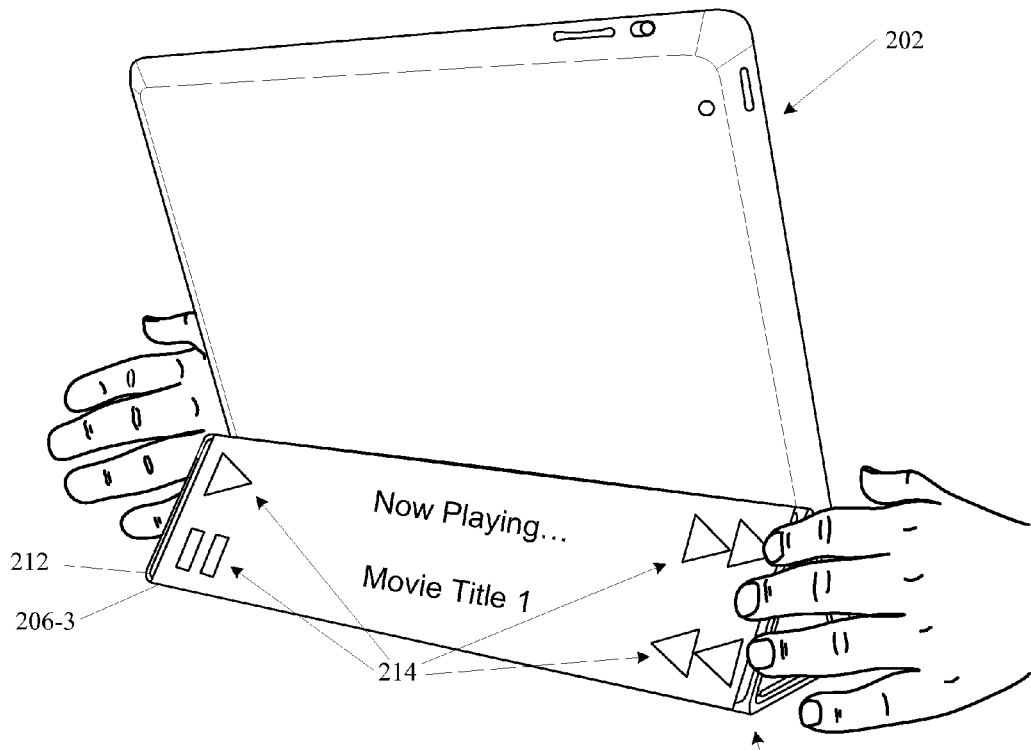
FIG. 2B shows a perspective view of a tablet device supported by a segmented cover in an orientation which makes the tablet convenient for watching video.

FIG. 2B shows a perspective view of tablet device 202 supported by flexible cover 204 arranged such that tablet device 202 can be placed in a convenient orientation for watching video. Flexible cover 204 can include cover display 206-3 which covers at least single segment 212. Cover display 206 can include user input regions having controls that can be used to affect the operation of tablet device 202. For example, in those situations where video is presented on tablet device 202, input regions can include, for example, touch sensitive areas 214 located near the outer edges of flexible cover 204. The touch sensitive areas 214 can allow specific user input that can provide for enabling functions such as play, pause, fast forward, and rewind. Although touch sensitive areas 214 are not visible to a user while viewing a video, the size and location of the touch sensitive areas can allow for a user to easily learn the locations after a short familiarization period. This allows a user to control the video display without having to manipulate on screen controls on the tablet display (not shown), which can interfere with the movie watching experience. Cover display 206 can also indicate the type of content that is being viewed, as illustrated in FIG. 2B. Furthermore, this orientation is also convenient for reading through or reviewing documents, in which case large touch sensitive areas 214 could be configured as arrows for panning left, right, up and down across a document, or for performing any number of other useful functions. This prevents for example a user's hands or fingers from obscuring portions of a document as the user navigates through it.

Figure 3A:
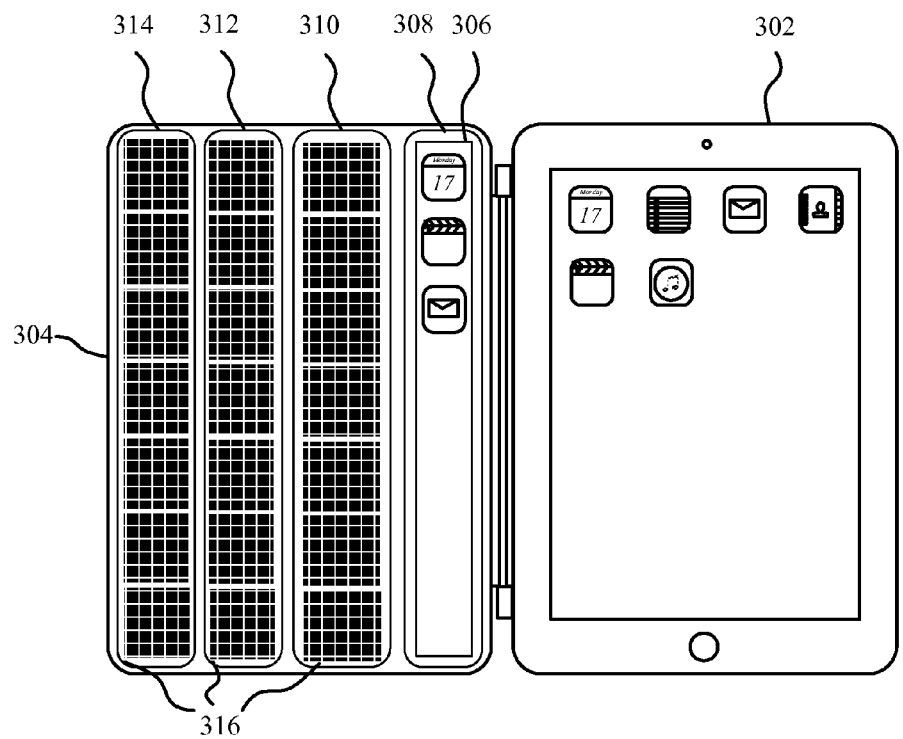
FIGS. 3A and 3B shows a top view of a tablet device attached to a flexible cover having an integrated auxiliary display and ambient power collectors.

FIG. 3A shows a top view of tablet device 302 attached to a full extended flexible cover 304 with cover display 306. A small cover display 306 as shown overlaid on first segment 308 can exhibit all the advantages of the functionality described above in FIG. 2A, while allowing for the use of a less expensive, smaller, lower power display than one covering the entire inside of cover 304. A smaller cover display 306 also allows the inclusion of other features into the inside surface of flexible cover 302. Features such as ambient energy collectors can be included. It should be noted that ambient energy can be considered to be any form of energy to which flexible cover 302 is exposed. For example, ambient energy can take the form of ambient light energy (sunlight, artificial light, and so on), RF energy, and so forth. FIG. 3A shows a specific embodiment with second segment 310, third segment 312, and fourth segment 314 integrated with solar panels 316 arranged to collect useful amounts of solar energy (or more simply ambient light from artificial sources such as a light bulb). Solar panels 316 configured in this way can supply power to cover display 306. In another embodiment cover display 306 can include touch sensitive control. In this configuration cover display 306 can display and allow selection from a list of active program icons, enabling convenient switching between active applications. Alternatively, cover display 306 can display program toolbars or even a list of bookmarks for a PDF document, thereby freeing up screen area while enabling more convenient access to application functionality. In yet another embodiment both sides of flexible cover 304 could be covered with solar panels 316. In this embodiment an electrical connection between tablet device 302 and flexible cover 304 can function to move energy from flexible cover 304 to tablet device 302.

Figure 3B:
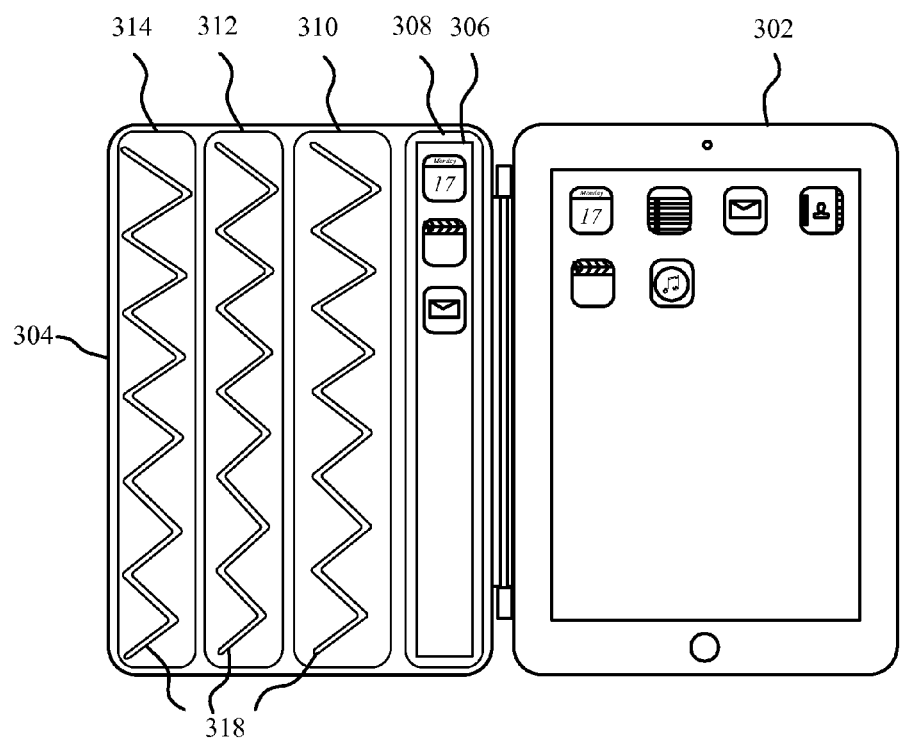

FIG. 3B shows a similar embodiment to the representation shown in FIG. 3A. In this figure flexible cover display 302 has RF energy collection antennas 318 integrated into second segment 310, third segment 312 and fourth segment 314. RF energy collectors can be used to gather ambient RF energy from specific frequency bands broadcast by a number of nearby transmitters such as Wi-Fi antennas, cell phone towers, or even radio waves. Although RF energy harvesting without a dedicated transmitter typically yields modest amounts of energy, the energy could be used to trickle charge a micro battery or super capacitor contained within flexible cover 304. This energy could then be applied to handle low energy tasks such as querying tablet device 302 for the presence of any notification updates, or even powering a low power sensor such as a thermometer. One advantage of this configuration over the solar panels of FIG. 3A is that the RF antennas 318 could collect energy with flexible cover 304 in an open or closed state. A combination of solar panels 316 and RF Antennas 318 can also be combined in one embodiment of the flexible cover.

FIG. 4A shows a cross section of system 400 in accordance with an embodiment. System 400 can include tablet device 402 magnetically attached to cover assembly 404 by way of magnetic hinge assembly 406. Cover assembly 404 can include segmented cover 408 pivotally attached to hinge assembly 404 at pivot 410. Hinge assembly 406 can be magnetically attached to tablet device 402 by way of magnetic element 412 in hinge assembly 406 and magnetic attachment feature 414 in tablet device 402. Intervening layer 416 can act to prevent direct metal to metal contact between hinge assembly 406 and housing 418 of tablet device 402.

Cover assembly 404 can also include separate flap portion 420 pivotally attached to hinge assembly 406 at pivot 422. In this way, segmented cover 408 and flap portion 420 can be rotated about their respective pivots separately as shown in FIG. 4B where segmented cover 408 has been folded into support structure 424. Support structure 424 can be triangular in shape and be used to position tablet device 402 such that tablet display 426 is presented at about an angle of 75°. Support structure 424 can also include cover display 206 as described in the description accompanying FIG. 2B. In addition to the embodiment described in FIG. 2B, cover display 206 could work independently or in conjunction with any additional controls or displays included on flap portion 420. In this way, a user could easily switch from using controls on flap portion 420 to manipulating video controls. This might be desirable when reviewing email. After finishing writing an email with controls built into flap portion 420, a user might receive an email with a link to an internet video, in which case the user could follow the link and then quickly control the playback of the internet video with touch screen controls arranged on cover display 206.

Flap portion 420 can be formed of flexible material such as fabric. In one embodiment, flap portion 420 can include various input devices. For example, as shown in FIG. 5, flap portion 420 can include keyboard 502. Keyboard 502 can be in communication with tablet device 402 using, for example, a wired connection. In another embodiment, keyboard 502 can be in wireless communication with tablet device 402. Accordingly, information can be input into tablet device 402 by pressing various input keys on fabric keyboard 502 which can give positive tactile feedback. Having a separate keyboard attached to tablet device 402 while tablet device 402 is in a convenient viewing angle has a number of advantages. First, this configuration gives the user an experience much closer to the one enjoyed by laptop users. Second, by allowing the user to easily view the screen and by providing a convenient surface to type on, tasks such as word processing and email become much more efficient. Third, the experience is even better in some ways than the laptop experience as most laptops do not include rear facing touch controls for video or document manipulation. Finally, the addition of flap portion 420 adds no significant weight or bulk to the tablet device and makes this configuration a true laptop alternative. Even more functionality can be added to flap portion 420 by configuring it with flap screen 504, positioned either above (as shown in FIG. 5) or below keyboard 502. When configured above keyboard 502 flap screen 504 could allow for customized virtual keys to be added specific to each application, or could be used as a way to display additional application data. Flap screen 504 could also be configured with application toolbars, or even an active application list for easily switching between active applications. When flap screen 504 is configured below keyboard 502 it could act as a replacement for a touch pad, bringing the experience even closer to a conventional laptop configuration. With this configuration a cursor can even be implemented in applications where useful.

It should be noted that flap portion 420 can be configured to include any suitable type of input device. For example, in one embodiment shown in FIG. 6, flap portion 420 can include flap screen 602 across a majority of the surface of flap portion 420. This configuration allows for the display of a configurable keyboard or a completely customized control scheme, as might be desirable for mixing music or video compilations. As can be appreciated by one skilled in the art, a second touch screen could be used for a number of functional enhancements as it effectively doubles the usable display area of the tablet.

Figure 7A:
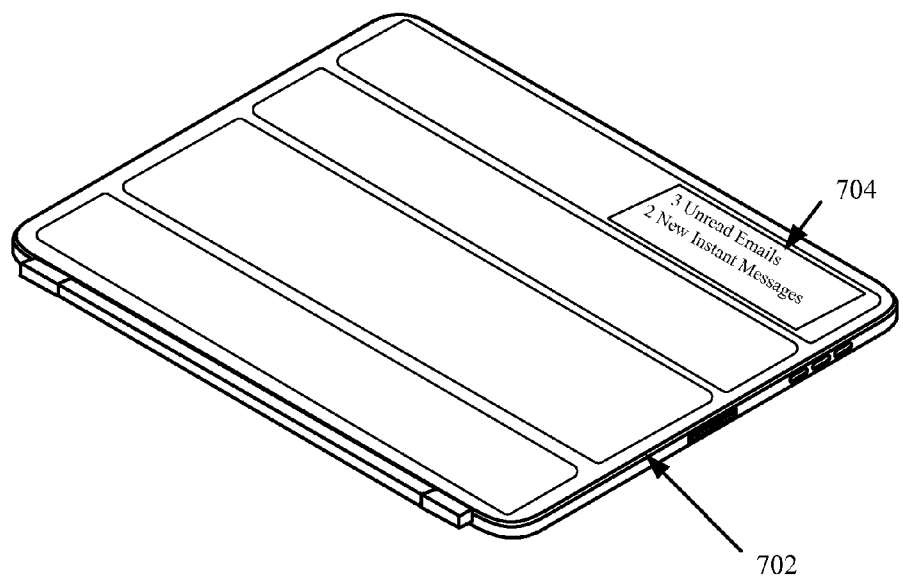
FIGS. 7A, 7B, and 7C show embodiments with cover displays configured on the outside surface of tablet device covers.
Figure 7B:
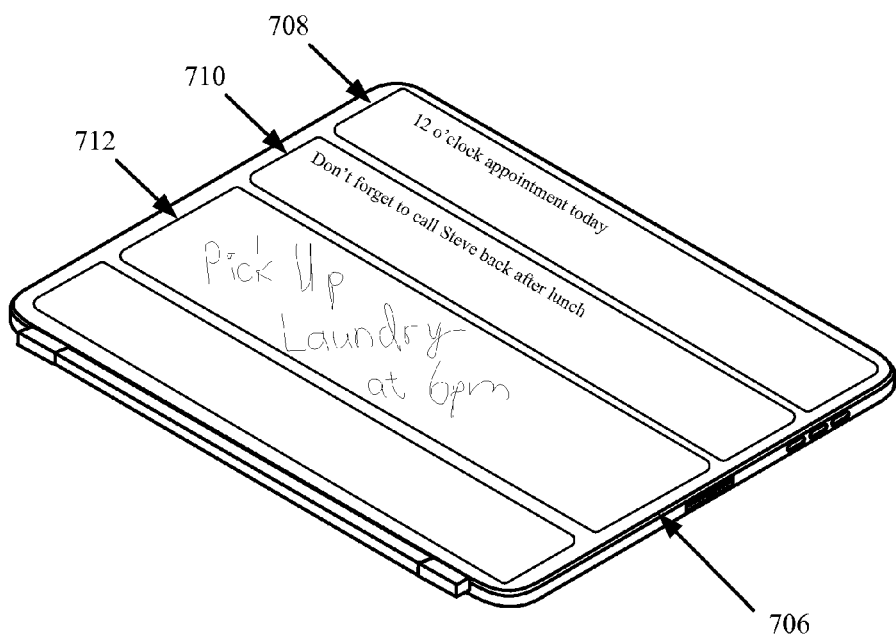
Figure 7C:
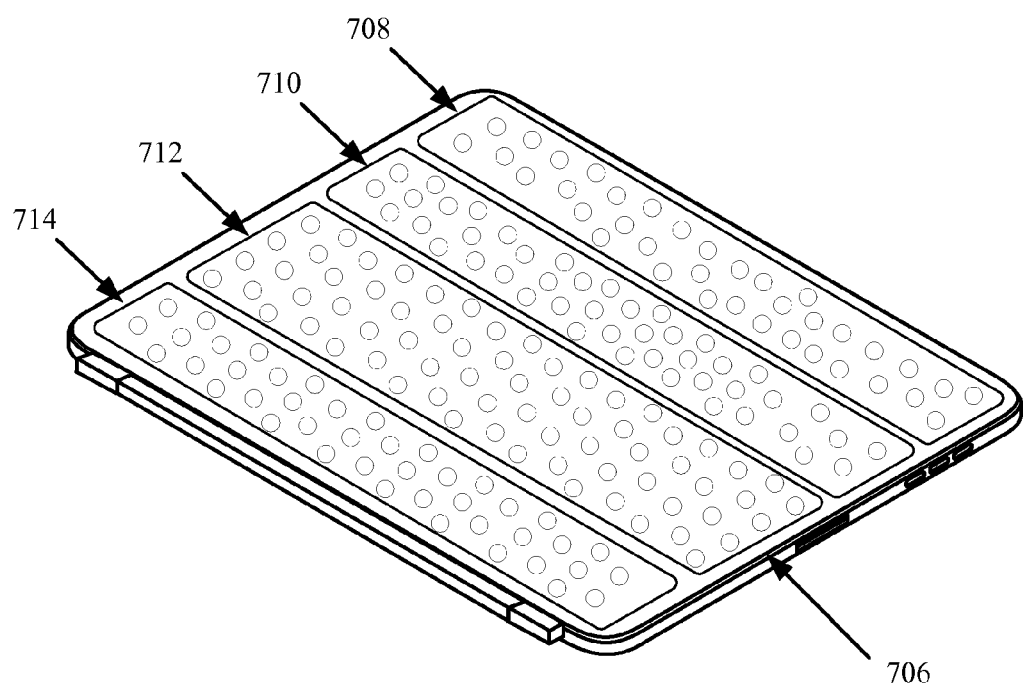

FIGS. 7A, 7B, and 7C show embodiments with cover displays configured on the outside surface of tablet device covers. These embodiments can allow a tablet device with a covered screen to display an alert in response to some event without the assistance of the tablet display. In FIG. 7A flexible cover 702 is shown with a small cover display 704 for showing notifications such as recent emails, instant messages, or upcoming calendar events. Cover display 704 can be made with AMOLED technology. As stated previously, AMOLED screens can illuminate a discrete number of pixels which allows small amounts of text to be displayed at extremely conservative power levels. AMOLED technology has also been implemented in extremely thin configurations and cover display 704 would not add significant depth to flexible cover 702.

FIG. 7B shows flexible cover 706 which in this particular embodiment is shown with displays spread across each of three panels of flexible cover 706. In this embodiment the displays spread across first segment 708, second segment 710, and third segment 712 can be made with electronic paper technology, similar to the display technology used by standalone E-reader devices. In this embodiment flexible electronic paper displays are not required since they are overlaid on top of the following rigid portions of flexible cover 706: segment 708; segment 710; and segment 712. These electronic paper displays require no additional power to continuously hold an image on the display; therefore this allows information to be displayed on the outside cover without the need for continuous electrical current. This allows for example the display of calendar reminder messages as shown in first segment 708, or reminder lists as shown in segment 710, or even a scribbled reminder as shown in segment 712. By installing a color electronic paper display the cover could even have user-configurable colors. The electronic paper technology also allows flexible cover 706, which may rely solely on an external power source, to continue to maintain whatever information was being displayed after the external power source is disconnected.

FIG. 7C shows yet another possible embodiment in which the electronic paper displays are used to cover all four segments 708-714 of flexible cover 706 with custom patterns or designs. Although a polka dotted pattern is displayed in FIG. 7C, stripes, stars, or any number of other user-created or commercially produced patterns are certainly possible.

Figure 8:
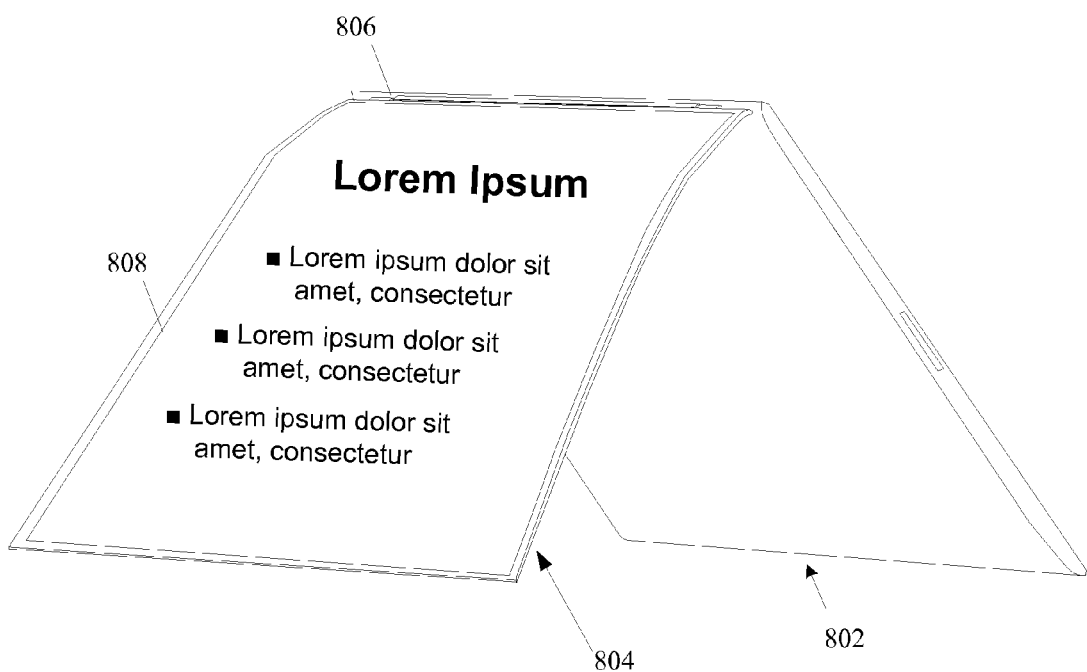
FIG. 8 shows a perspective view of a tablet device supported by a flexible cover accessory in accordance with an alternate embodiment.

FIG. 8 shows a perspective view of tablet device 802 supported by flexible cover 804 in accordance with an alternate embodiment. In this embodiment flexible cover 804 does not have any of the stiffeners that were present in the previous embodiments. Instead flexible cover 804 can be made of a material that is substantially rigid in nature but also deformable. This allows flexible cover 804 to be manipulated into a number of different shapes, and then for a shape to be maintained until further manipulation is desired. FIG. 8 shows flexible cover 804 manipulated into one shape where flexible cover 804 is rigid enough to support the weight of tablet device 802 where one edge of flexible cover 804 and one edge of tablet device 802 are in contact with a flat surface. It is important to note that connecting portion 806 must also be rigid enough to maintain tablet device 802 and flexible cover 804 at a consistent relative angle with respect to each other. One way to accomplish this is to add a locking mechanism to connecting portion 806 so that the hinge portion of connecting portion 806 can swing freely during normal operations, but also be locked in place when required to support tablet device 802 in a free standing configuration as illustrated. Flexible cover 804 can also include cover display 808. Cover display 808 can include a user interface embodied by a touch sensitive input so that cover display 808 has equivalent functionality to the tablet display (not shown). This enables a number of useful applications. In one embodiment cover display 808 could be used as a presentation platform for a small audience. A speaker could stand behind tablet device 802 with the ability to manipulate controls and view speaker notes on the tablet display (not shown) while the audience views a presentation (as illustrated) on cover display 808. In another embodiment two users could simultaneously use the tablet with one user manipulating each display. This would enable robust two player gaming applications. By having both players on one device, lag created by network latencies can be avoided. For example, real-time action games and first-person shooter games can unfairly disadvantage users playing on slow networks. With a direct connection or a close range communications link these type of latencies can be substantially eliminated. In another embodiment two users can efficiently collaborate on more business-centric applications. For example, since each user can have an independent view and set of controls, given an appropriate software implementation a single document or spreadsheet can be efficiently edited simultaneously.

Figure 9:
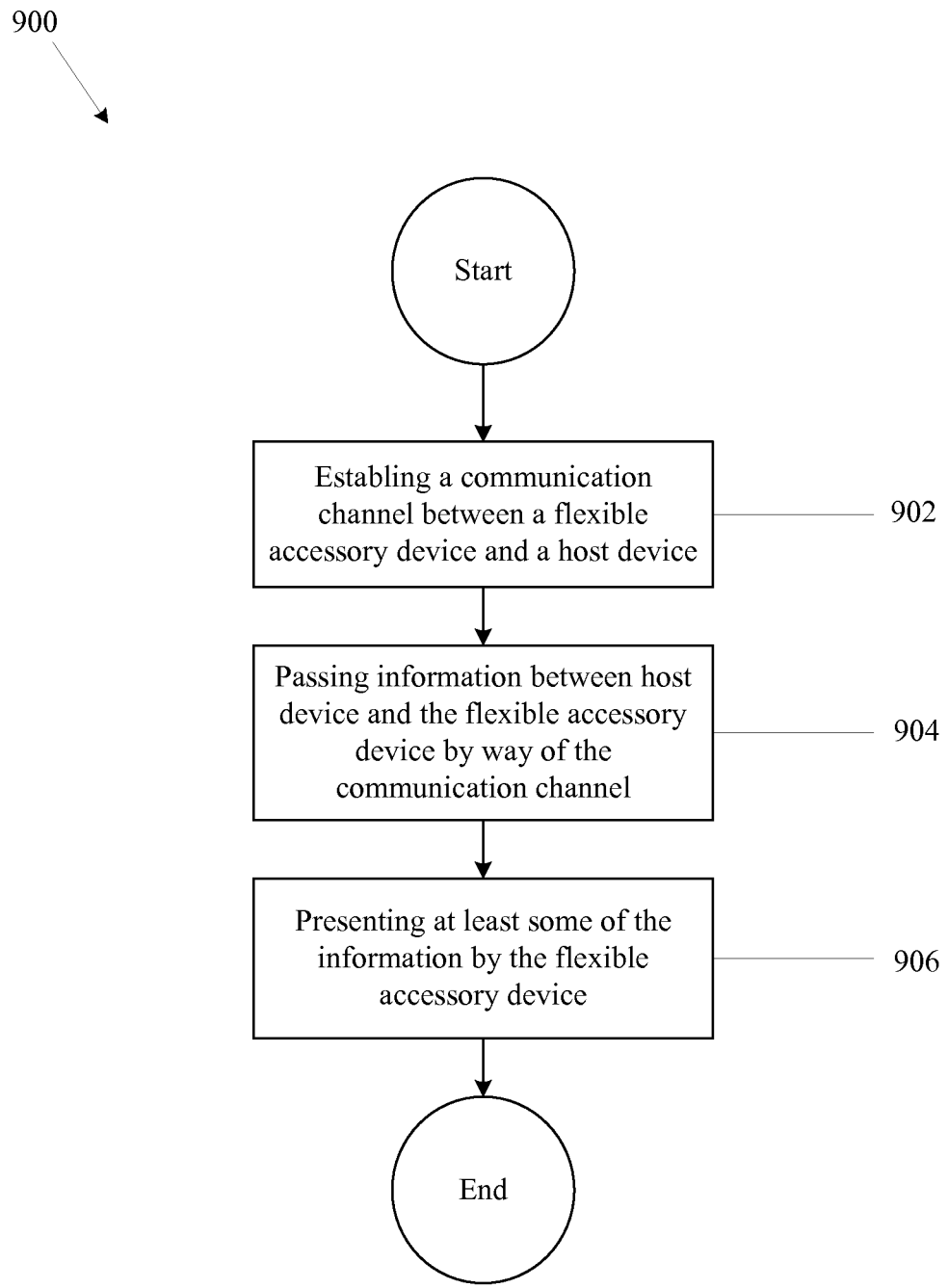
FIG. 9 shows a flow chart describing the input of instructions into an accessory device for use on a tablet device.

FIG. 9 shows flow chart 900 describing interaction between a flexible accessory device and a host device. In step 902 a communications link is established between the flexible accessory device and the host device. The communication link can be established through a physical connection between the two devices, or through a wireless protocol, and could be established in a single direction or in two ways for fully cooperative interaction between the devices. In step 904 information is passed between the two devices. This information could include video streams, picture slideshows, gaming data, messaging data, or any number of other types of information. Finally, in step 906 at least some of the information passed between the two devices is displayed by the flexible accessory device.

Figure 10:
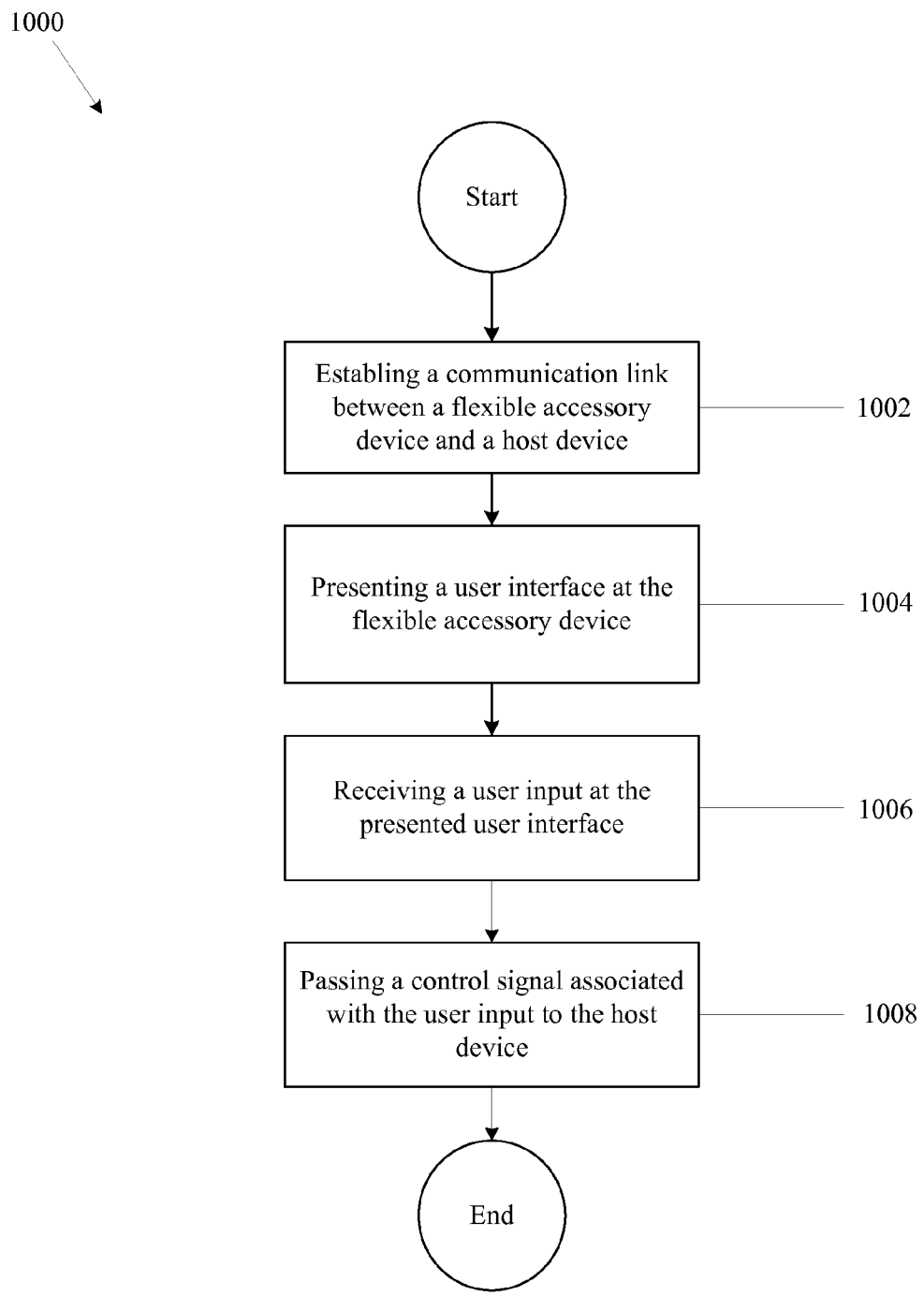
FIG. 10 shows a flow chart describing input on an accessory device which affects the operation of a tablet device.

FIG. 10 shows flow chart 1000 describing input on an accessory device which affects the operation of a tablet device. In step 1002 a communications link is established between the flexible accessory device and the host device. The communication link can be established through a physical connection between the two devices, or through a wireless protocol, and could be established in a single direction or in two ways for fully cooperative interaction between the devices. In step 1004 a user interface is presented by the flexible accessory device. The user interface could be a keyboard (virtual or physical), a customized control layout having virtual knobs and buttons specific to a certain application, or any other tailored control scheme useful for manipulating the host device or flexible accessory device. In step 1006 a user input is received at the user interface. In step 1008 a control signal is passed from the flexible accessory device to the host device. The control signal could operate to store items to the host device, to manipulate the host device display, or to accomplish any other desired change in state of the host device.

In the previous embodiments an accessory device has been used primarily as an additional control method for affecting a tablet device. In some embodiments the tablet device can be used to control functionality on the accessory device. For example, in an embodiment including wireless communication between the devices an auxiliary device with a screen could be configured to display photos, while the tablet could be used to adjust the display speed or transitions of the slideshow.

Figure 11:
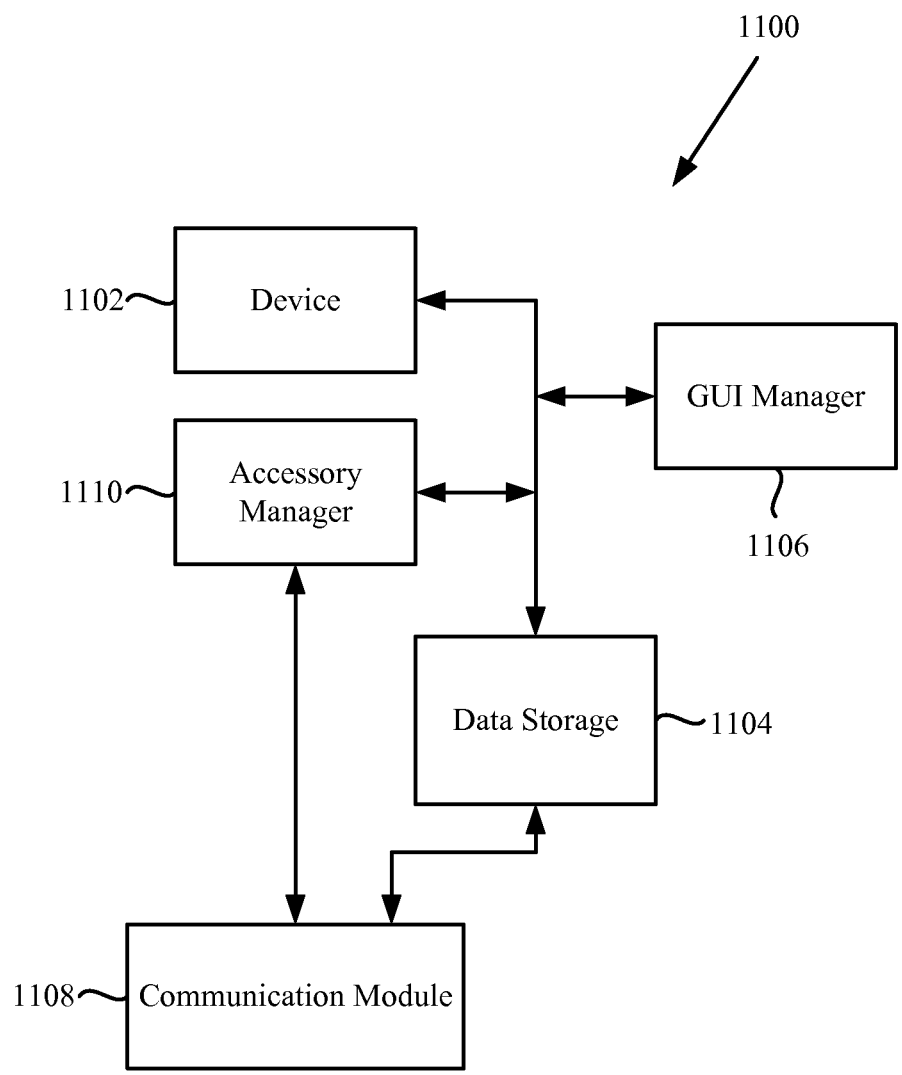
FIG. 11 shows a block diagram of an arrangement of functional modules utilized by an electronic device.

FIG. 11 is a block diagram of an arrangement 1100 of functional modules utilized by an electronic device. The electronic device can, for example, be tablet device 1100. The arrangement 1100 includes an electronic device 1102 that is able to output media for a user of the portable media device but also store and retrieve data with respect to data storage 1104. The arrangement 1100 also includes a graphical user interface (GUI) manager 1106. The GUI manager 1106 operates to control information being provided to and displayed on a display device. The arrangement 1100 also includes a communication module 1108 that facilitates communication between the portable media device and an accessory device. Still further, the arrangement 1100 includes an accessory manager 1110 that operates to authenticate and acquire data from an accessory device that can be coupled to the portable media device.

Figure 12:
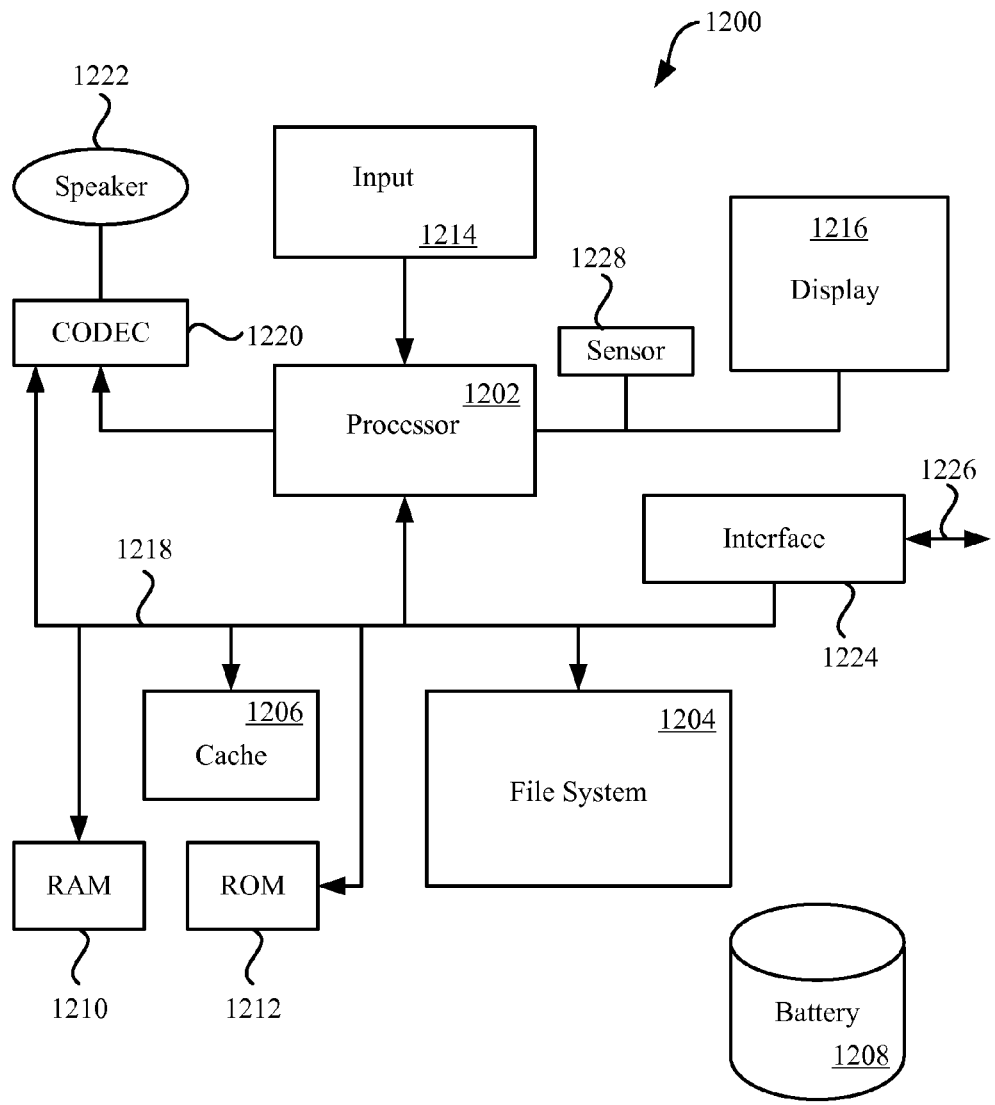
FIG. 12 shows a block diagram of an electronic device suitable for use with the described embodiments.

FIG. 12 is a block diagram of an electronic device 1200 suitable for use with the described embodiments. The electronic device 1200 illustrates circuitry of a representative computing device. The electronic device 1200 includes a processor 1202 that pertains to a microprocessor or controller for controlling the overall operation of the electronic device 1200. The electronic device 1200 stores media data pertaining to media items in a file system 1204 and a cache 1206. The file system 1204 is, typically, a storage disk or a plurality of disks. The file system 1204 typically provides high capacity storage capability for the electronic device 1200. However, since the access time to the file system 1204 is relatively slow, the electronic device 1200 can also include a cache 1206. The cache 1206 is, for example, Random-Access Memory (RAM) provided by semiconductor memory. The relative access time to the cache 1206 is substantially shorter than for the file system 1204. However, the cache 1206 does not have the large storage capacity of the file system 1204. Further, the file system 1204, when active, consumes more power than does the cache 1206. The power consumption is often a concern when the electronic device 1200 is a portable media device that is powered by a battery 1208. The electronic device 1200 can also include RAM 1210 and Read-Only Memory (ROM) 1212. The ROM 1212 can store programs, utilities or processes to be executed in a non-volatile manner. The RAM 1210 provides volatile data storage, such as for the cache 1206.

The electronic device 1200 also includes a user input device 1214 that allows a user of the electronic device 1200 to interact with the electronic device 1200. For example, the user input device 1214 can take a variety of forms, such as a button, keypad, dial, touch screen, audio input interface, visual/image capture input interface, input in the form of sensor data, etc. Still further, the electronic device 1200 includes a display 1216 (screen display) that can be controlled by the processor 1202 to display information to the user. A data bus 1218 can facilitate data transfer between at least the file system 1204, the cache 1206, the processor 1202, and the CODEC 1220.

In one embodiment, the electronic device 1200 serves to store a plurality of media items (e.g., songs, podcasts, etc.) in the file system 1204. When a user desires to have the electronic device play a particular media item, a list of available media items is displayed on the display 1216. Then, using the user input device 1214, a user can select one of the available media items. The processor 1202, upon receiving a selection of a particular media item, supplies the media data (e.g., audio file) for the particular media item to a coder/decoder (CODEC) 1220. The CODEC 1220 then produces analog output signals for a speaker 1222. The speaker 1222 can be a speaker internal to the electronic device 1200 or external to the electronic device 1200. For example, headphones or earphones that connect to the electronic device 1200 would be considered an external speaker.

The electronic device 1200 also includes a network/bus interface 1224 that couples to a data link 1226. The data link 1226 allows the electronic device 1200 to communicate with a host computer or to accessory devices. The data link 1226 can be provided over a wired connection or a wireless connection. In the case of a wireless connection, the network/bus interface 1224 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 1228 can take the form of circuitry for detecting any number of stimuli. For example, sensor 1228 can include a Hall Effect sensor responsive to external magnetic field, an audio sensor, a light sensor such as a photometer, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A flexible accessory device releasably attachable to a tablet device having a back surface and a front surface substantially all of which is a display having a size and a shape and configured to present tablet device visual content, the flexible accessory device comprising:

a single flexible flap having at least the size and the shape of the front surface of the tablet device and pivotally movable with respect to the tablet device, the single flexible flap comprising segments joined at a foldable region that renders the segments foldable with respect to each other and the tablet device, wherein a folded configuration comprises a first segment used to support the tablet device at the back surface and a second segment used to support the tablet device at an angle with respect to a support surface; and a single non-segmented flexible display disposed over the foldable region and capable of communication with the tablet device and presenting flap visual content in a segmented manner, wherein the single non-segmented flexible display disposed over only a third segment is used to present the flap visual content in the folded configuration, the third segment different from the first segment and the second segment.

2. The flexible accessory device of claim 1, wherein the folded configuration comprises a triangular shape defined by the first segment, the second segment, and the third segment.

3. The flexible accessory device of claim 2, wherein the single flexible display is disposed on the first segment, the second segment, and the third segment.

4. The flexible accessory device of claim 3, further comprising a fourth segment, wherein the triangular shape includes the fourth segment and wherein the fourth segment engages one of the first segment, the second segment, and the third segment.

5. The flexible accessory device of claim 1, wherein the flap visual content disposed on the third segment comprises a touch sensitive area defining a user input capable of controlling the tablet device when the single flexible flap is in the folded configuration.

6. The flexible accessory device of claim 5, wherein the user input is selected from a group consisting of a play, a pause, a fast forward, and a rewind.

7. The flexible accessory device of claim 1, wherein when the single flexible flap is in the folded configuration, a portion of the single flexible display disposed on the first segment and the second segment is deactivated.

8. An accessory device releasably coupled with a tablet device having a tablet device display that substantially fills a front portion arranged to present tablet visual content, a rear portion opposite the front portion, and a sensor, the accessory device comprising:
    a cover having a size and a shape to cover the tablet device display, the cover capable of folding into a folded configuration that is detectable by the sensor, the folded configuration rendering a first portion of the cover accessible and a remaining portion inaccessible; and
    a cover display conformally attached with the cover, the cover display receiving power from the tablet device and presenting cover visual content only at a location corresponding to the first portion in the folded configuration.

9. The accessory device of claim 8, wherein the folded configuration includes a triangular shape.

10. The accessory device of claim 8, wherein the cover comprises:
    a first segment;
    a second segment;
    a first foldable region separating the first segment from the second segment;
    a third segment; and
    a second foldable region separating the second segment from the third segment, wherein:
        the first segment pivots about the second segment at the first foldable region, and
        the third segment pivots about the second segment at the second foldable region.

11. The accessory device of claim 10, wherein the folded configuration is defined by the first segment, the second segment, and the third segment.

12. The accessory device of claim 10, further comprising a fourth segment and a third foldable region separating the third segment from the fourth segment, wherein:
    the cover display is disposed over the third segment and the fourth segment, and
    the first segment engages the fourth segment when the folded configuration includes a triangular shape.

13. The accessory device of claim 8, wherein the cover display receives power from the tablet device, and wherein the visual content is only at a location of the cover display disposed on the third segment.

14. The accessory device of claim 8, wherein the second segment engages the rear portion.

15. The accessory device of claim 12, wherein:
    the cover display comprises a touch sensitive area located in the visual content, the touch sensitive area comprising a user input function selected from a group consisting of a play, a pause, a fast forward, and a rewind, and
    the user input function is a control sent to the tablet device.

16. An accessory device suitable for use with a tablet device having a tablet display, the accessory device comprising:
    a hinge assembly capable of releasably attaching with the tablet device;
    a segmented cover pivotally attached to the hinge assembly at a first pivot;
    a flap portion pivotally attached to the hinge assembly at a second pivot different than the first pivot; and
    wherein:
        in a closed configuration, the segmented cover and the flap portion include a size and a shape that covers the tablet display, and
        in an open configuration, the segmented cover rotates about the first pivot and folds define a support structure for the tablet device and the flap portion rotates about the second pivot forming an obtuse angle with respect to the tablet display.

17. The accessory device of claim 16, wherein the flap portion comprises a cover display in electrical communication with the tablet device.

18. The accessory device of claim 17, wherein the flap portion further comprises a keyboard.

19. The accessory device of claim 17, wherein the cover display comprises a touch screen that allows a user input that can be received by the tablet device.

20. The accessory device of claim 16, wherein the flap portion is positioned between the segmented cover and the tablet display in the closed configuration.

21. The accessory device of claim 20, wherein the flap portion engages the segmented cover and the tablet display in the closed configuration.

22. The accessory device of claim 16, wherein the segmented cover comprises at least a first segment, a second segment, a third segment and a fourth segment.

23. The accessory device of claim 16, wherein the segmented cover comprises a first segment, a second segment, and a third segment, and wherein the first segment, the second segment, and the third segment are configured to fold to combine a triangular support to support the tablet device.

* * * * *